United States Patent
Achmatowicz et al.

(10) Patent No.: US 12,441,729 B2
(45) Date of Patent: *Oct. 14, 2025

(54) PROCESS FOR PREPARING 7-CHLORO-6-FLUORO-1-(2-ISOPROPYL-4-METHYLPYRIDIN-3-YL)PYRIDO[2,3-D]PYRIMIDINE-2,4(1H,3H)-DIONE

(71) Applicant: AMGEN INC., Thousand Oaks, CA (US)

(72) Inventors: Michal Achmatowicz, San Diego, CA (US); John T. Colyer, Newbury Park, CA (US); Michael T. Corbett, San Carlos, CA (US); Daniel J. Griffin, Cambridge, MA (US); Andrew T. Parsons, Cambridge, MA (US); Joanna Robinson, Los Angeles, CA (US); Kyle Quasdorf, Thousand Oaks, CA (US)

(73) Assignee: AMGEN INC., Thousand Oaks, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/987,521

(22) Filed: Dec. 19, 2024

(65) Prior Publication Data
US 2025/0129072 A1    Apr. 24, 2025

Related U.S. Application Data

(63) Continuation of application No. 18/253,285, filed as application No. PCT/US2021/060048 on Nov. 19, 2021.

(60) Provisional application No. 63/116,703, filed on Nov. 20, 2020.

(51) Int. Cl.
C07D 471/04    (2006.01)

(52) U.S. Cl.
CPC .................. C07D 471/04 (2013.01)

(58) Field of Classification Search
CPC .................................. C07D 471/04
USPC ........................................ 544/279
See application file for complete search history.

(56) References Cited

U.S. PATENT DOCUMENTS

| | | | |
|---|---|---|---|
| 5,648,537 A | 7/1997 | Hussenet | |
| 10,519,146 B2 * | 12/2019 | Lanman | A61K 31/416 |
| 10,532,042 B2 | 1/2020 | Lanman | |
| 10,640,504 B2 | 5/2020 | Lanman | |
| 11,285,135 B2 | 3/2022 | Lanman | |
| 11,299,491 B2 * | 4/2022 | Parsons | C07C 309/24 |
| 2016/0176845 A1 | 6/2016 | Haim | |
| 2024/0025896 A1 * | 1/2024 | Achmatowicz | C07D 471/04 |

FOREIGN PATENT DOCUMENTS

| | | | | |
|---|---|---|---|---|
| CN | 107108507 | | 8/2017 | |
| CN | 111377918 A | * | 7/2020 | ............. A61P 35/00 |
| JP | 08259513 | | 10/1996 | |
| JP | 2007505865 | | 3/2007 | |
| JP | 2018501237 | | 1/2018 | |
| WO | 2005028459 | | 3/2005 | |
| WO | 2016100652 | | 6/2016 | |
| WO | 2018119183 A2 | | 6/2018 | |
| WO | 2018217651 A1 | | 11/2018 | |
| WO | 2019051291 A1 | | 3/2019 | |
| WO | 2019213516 A1 | | 11/2019 | |
| WO | 2019213526 A1 | | 11/2019 | |
| WO | 2019217691 A1 | | 11/2019 | |
| WO | 2019232419 A1 | | 12/2019 | |
| WO | 2019241157 A1 | | 12/2019 | |
| WO | 2020-050890 A2 | | 3/2020 | |
| WO | 2020102730 A1 | | 5/2020 | |

(Continued)

OTHER PUBLICATIONS

Biernacka A. et al. "The potential utility of re-mining results of somatic mutation testing: KRAS status in lung adenocarcinoma" Cancer Genet., 209:195-8 (2016).

(Continued)

*Primary Examiner* — Niloofar Rahmani

(57) ABSTRACT

Provided herein is a process for preparing compound A comprising (a) admixing 2-isopropyl-4-methylpyridin-3-amine (Compound B), or a salt thereof, a first base, and a reactive compound comprising phosgene or a phosgene equivalent in an organic solvent to form 3-isocyanato-2-isopropyl-4-methylpyridine (Compound C); (b) admixing Compound C and 2,6-dichloro-5-fluoronicotinamide (Compound D) to form 2,6-dichloro-5-fluoro-N-((2-isopropyl-4-methylpyridin-3-yl)carbamoyl)nicotinamide (Compound E); and (c) admixing Compound E and a second base to form a product mixture comprising Compound A and the second base. Also provided herein is a process for synthesizing AMG 510 comprising using Compound A prepared according to the disclosed processes (Compound A)

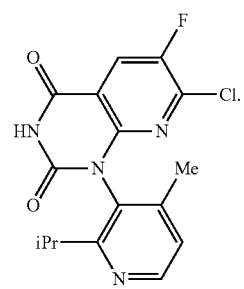

22 Claims, No Drawings

(56) References Cited

FOREIGN PATENT DOCUMENTS

| WO | 2020123395 | | 6/2020 |
|---|---|---|---|
| WO | 2021097207 | A1 | 5/2021 |
| WO | 2021097212 | A1 | 5/2021 |
| WO | 2022076623 | A1 | 4/2022 |
| WO | 2022109242 | A1 | 5/2022 |

OTHER PUBLICATIONS

Canon J. et al. "The clinical KRAS(G12C) inhibitor AMG 510 drives anti-tumour immunity" Nature, 575:217-23 (2019).
Clarke PA. et al. "Dissecting mechanisms of resistance to targeted drug combination therapy in human colorectal cancer" Oncogene, 38:5076-90 (2019).
Cox AD. et al., "Drugging the undruggable RAS: mission possible?" Nat. Rev. Drug Discov., 13:828-51 (2014).
Del Re M. et al., "Implications of KRAS mutations in acquired resistance to treatment in NSCLC" Oncotarget, 9:6630-43 (2017).
Fiala 0. et al., "G12V and G12A KRAS mutations are associated with poor outcome in patients with metastatic colorectal cancer treated with bevacizumab" Tumour Biol., 37:6823-30 (2016).
International Search Report and Written Opinion of the International Search Authority, European Patent Office, PCT/US2021/060048, dated Feb. 28, 2022.
Jones RP. et al., "Specific mutations in KRAS codon 12 are associated with worse overall survival in patients with advanced and recurrent colorectal cancer" Br. J. Cancer, 116:923-9 (2017).
Kargbo RB. "Inhibitors of G12C mutant Ras proteins for the treatment of cancers" ACS Med. Chem. Lett. 10:10-1 (2018).
Lanman et al., Discovery of a Covalent Inhibitor of KRASG12C (AMG 510) for the Treatment of Solid Tumors, J. Med. Chem.; 63:52-65 (2020).
Lievre A. et al. "KRAS mutation status is predictive of response to cetuximab therapy in colorectal cancer" Cancer Res., 66:3992-5 (2006).
Lito P. et al., "Allele-specific inhibitors inactivate mutant KRAS G12C by a trapping mechanism" Science 351:604-8 (2016).
Massarelli E. et al. "KRAS mutation is an important predictor of resistance to therapy with epidermal growth factor receptor tyrosine kinase inhibitors in non-small-cell lung cancer" Clin. Cancer Res., 13:2890-6 (2007).
McCormick F. "K-Ras protein as a drug target" J. Mol. Med. (Berl), 94:253-8 (2016).
Nadal E. et al. "KRAS-G12C mutation is associated with poor outcome in surgically resected lung adenocarcinoma" J. Thorac. Oncol., 9:1513-22 (2014).
Neumann J. et al., "Frequency and type of KRAS mutations in routine diagnostic analysis of metastatic colorectal cancer" Pathol. Res. Pract., 205:858-62 (2009).
Ostrem JM. et al., "K-Ras(G12C) inhibitors allosterically control GTP affinity and effector interactions" Nature 503:548-51 (2013).
Ouerhani et al., "The mutational spectrum of HRAS, KRAS, NRAS and FGFR3 genes in bladder cancer" Cancer Biomark, 10:259-66 (2011-2012).
Patricelli MP. et al. "Selective inhibition of oncogenic KRAS output with small molecules targeting the inactive state" Cancer Discov., 6:316-29 (2016).
Simanshu DK. et al., "RAS proteins and their regulators in human disease" Cell, 170:17-33 (2017).
Suzawa K. et al. "Activation of KRAS mediates resistance to targeted therapy in MET exon 14-mutant non-small cell lung cancer" Clin. Cancer Res., 25:1248-60 (2019).
Spargo, P. L., "Phosgenations—A Handbook by Livius Cotarca and Heiner Eckert," Org. Process Res. Dev., vol. 8, pp. 1085-1086 (2004).

* cited by examiner

PROCESS FOR PREPARING 7-CHLORO-6-FLUORO-1-(2-ISOPROPYL-4-METHYLPYRIDIN-3-YL)PYRIDO[2,3-D]PYRIMIDINE-2,4(1H,3H)-DIONE

CROSS-REFERENCE TO RELATED APPLICATION

This application is a continuation of U.S. application Ser. No. 18/253,285, filed May 17, 2023, which is a national stage application under 35 U.S.C § 371 of International Application No. PCT/US2021/060048, filed Nov. 19, 2021, which claims the benefit of priority to U.S. Provisional Patent Application No. 63/116,703, filed Nov. 20, 2020. Each of the foregoing applications is incorporated herein by reference in its entirety for all purposes.

BACKGROUND

KIRSTEN RAT SARCOMA VIRAL ONCOGENE homologue (KRAS) is the most frequently mutated oncogene in human cancers and encodes a guanosine triphosphatase (GTPase) that cycles between active guanosine triphosphate (GTP)—bound and inactive guanosine diphosphate (GDP)—bound states to regulate signal transduction. See, for example, Simanshu D K, Nissley D V, McCormick F. "RAS proteins and their regulators in human disease" in Cell 2017; 170:17-33.

KRAS mutations are often associated with resistance to targeted therapies and poor outcomes in patients with cancer, yet no selective KRAS inhibitor has been approved despite more than three decades of scientific effort. See, for example, Nadal E, Chen G, Prensner J R, et al. "KRAS-G12C mutation is associated with poor outcome in surgically resected lung adenocarcinoma" in *J Thorac Oncol* 2014; 9:1513-22; Massarelli E, Varella-Garcia M, Tang X, et al. "KRAS mutation is an important predictor of resistance to therapy with epidermal growth factor receptor tyrosine kinase inhibitors in non-small-cell lung cancer" in *Clin Cancer Res* 2007; 13:2890-6; Fiala 0, Buchler T, Mohelnikova-Duchonova B, et al. "G12V and G12A KRAS mutations are associated with poor outcome in patients with metastatic colorectal cancer treated with bevacizumab" in *Tumour Biol* 2016; 37:6823-30; Lie vre A, Bachet J-B, Le Corre D, et al. "KRAS mutation status is predictive of response to cetuximab therapy in colorectal cancer" in *Cancer Res* 2006; 66:3992-5; McCormick F. "K-Ras protein as a drug target" in *J Mol Med (Berl)* 2016; 94:253-8; Jones R P, Sutton P A, Evans J P, et al. "Specific mutations in KRAS codon 12 are associated with worse overall survival in patients with advanced and recurrent colorectal cancer" in *Br J Cancer* 2017; 116:923-9; Cox A D, Fesik S W, Kimmelman A C, Luo J, Der C J. "Drugging the undruggable RAS: mission possible?" in *Nat Rev Drug Discov* 2014; 13:828-51; Ostrem J M L, Shokat K M. "Direct small molecule inhibitors of KRAS: from structural insights to mechanism-based design" in *Nat Rev Drug Discov* 2016; 15:771-85; Suzawa K, Offin M, Lu D, et al. "Activation of KRAS mediates resistance to targeted therapy in MET exon 14-mutant non-small cell lung cancer" in *Clin Cancer Res* 2019; 25:1248-60; Clarke P A, Roe T, Swabey K, et al. "Dissecting mechanisms of resistance to targeted drug combination therapy in human colorectal cancer" in Oncogene 2019; 38:5076-90; and Del Re M, Rofi E, Restante G, et al. "Implications of KRAS mutations in acquired resistance to treatment in NSCLC" in *Oncotarget* 2017; 9:6630-43.

The KRAS G12C mutation occurs in approximately 13% of non-small-cell lung cancers (NSCLCs) and in 1 to 3% of colorectal cancers and other solid cancers. See, for example, Cox A D, Fesik S W, Kimmelman A C, Luo J, Der C J. "Drugging the undruggable RAS: mission possible?" in *Nat Rev Drug Discov* 2014; 13:828-51; Biernacka A, Tsongalis P D, Peterson J D, et al. "The potential utility of re-mining results of somatic mutation testing: KRAS status in lung adenocarcinoma" in *Cancer Genet* 2016; 209:195-8; Neumann J, Zeindl-Eberhart E, Kirchner T, Jung A. "Frequency and type of KRAS mutations in routine diagnostic analysis of metastatic colorectal cancer" in *Pathol Res Pract* 2009; 205:858-62; and Ouerhani S, Elgaaied A B A. "The mutational spectrum of HRAS, KRAS, NRAS and FGFR3 genes in bladder cancer" in *Cancer Biomark* 2011-2012; 10:259-66.

The glycine-to-cysteine mutation at position 12 favors the active form of the KRAS protein, resulting in a predominantly GTP-bound KRAS oncoprotein and enhanced proliferation and survival in tumor cells. See, for example, Ostrem J M, Peters U, Sos M L, Wells J A, Shokat K M. "K-Ras (G12C) inhibitors allosterically control GTP affinity and effector interactions" in *Nature* 2013; 503:548-51 and Kargbo R B. "Inhibitors of G12C mutant Ras proteins for the treatment of cancers" in *ACS Med Chem Lett* 2018; 10:10-1.

The mutated cysteine resides next to a pocket (P2) of the switch II region. The P2 pocket is present only in the inactive GDP-bound conformation of KRAS and has been exploited to establish covalent inhibitors of $KRAS^{G12C}$. See, for example, Ostrem J M, Peters U, Sos M L, Wells J A, Shokat K M. "K-Ras (G12C) inhibitors allosterically control GTP affinity and effector interactions" in *Nature* 2013; 503:548-51; Lito P, Solomon M, Li L-S, Hansen R, Rosen N. "Allele-specific inhibitors inactivate mutant KRAS G12C by a trapping mechanism" in *Science* 2016; 351:604-8; and Patricelli M P, Janes M R, Li L-S, et al. "Selective inhibition of oncogenic KRAS output with small molecules targeting the inactive state" in *Cancer Discov* 2016; 6:316-29.

AMG 510 is a small molecule that specifically and irreversibly inhibits $KRAS^{G12C}$ through a unique interaction with the P2 pocket. The inhibitor traps $KRAS^{G12C}$ in the inactive GDP-bound state by a mechanism similar to that described for other $KRAS^{G12C}$ inhibitors. See, for example, Lito P, Solomon M, Li L-S, Hansen R, Rosen N. "Allele-specific inhibitors inactivate mutant KRAS G12C by a trapping mechanism" in *Science* 2016; 351:604-8. Preclinical studies showed that AMG 510 inhibited nearly all detectable phosphorylation of extracellular signal-regulated kinase (ERK), a key downstream effector of KRAS, leading to durable complete tumor regression in mice bearing $KRAS^{G12C}$ tumors. See, for example, Canon J, Rex K, Saiki A Y, et al. "The clinical KRAS(G12C) inhibitor AMG 510 drives anti-tumour immunity" in Nature 2019; 575:217-23.

AMG 510 has the following chemical structure:

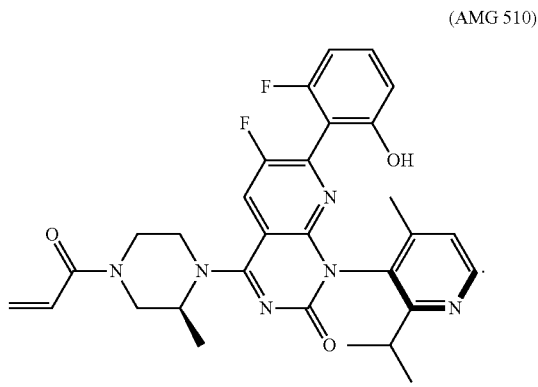

(AMG 510)

The compound has an atropisomeric chiral center, wherein in the (M)-configuration (shown above) is more active at the target protein than the (P)-configuration.

One synthetic intermediate in the synthesis of AMG 510 is compound A, which has an IUPAC name of 7-chloro-6-fluoro-1-(2-isopropyl-4-methylpyridin-3-yl)pyrido[2,3-d]pyrimidine-2,4(1H,3H)-dione, and a structure of:

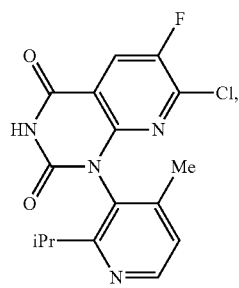

Compound A which can exist as the (P)- and (M)-atropisomers having the following structures:

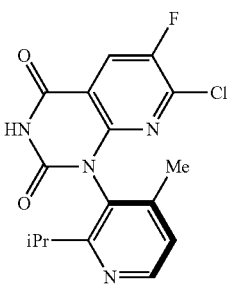

(P)-Compound A

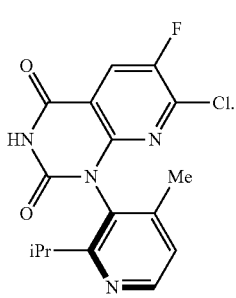

(M)-Compound A

In the synthesis of AMG 510, (M)-Compound A, obtained from Compound A, is carried forward in the synthesis and converted to AMG 510.

In view of the foregoing, there is a need for an efficient, scalable, cost-effective processes for preparing Compound A.

SUMMARY

As described herein, the disclosure provides processes for preparing compound A:

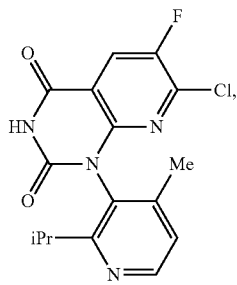

(A)

comprising (a) admixing 2-isopropyl-4-methylpyridin-3-amine (Compound B), or a salt thereof, a first base, and a reactive compound comprising phosgene or a phosgene equivalent in an organic solvent to form 3-isocyanato-2-isopropyl-4-methylpyridine (Compound C); (b) admixing Compound C and 2,6-dichloro-5-fluoronicotinamide (Compound D) to form 2,6-dichloro-5-fluoro-N-((2-isopropyl-4-methylpyridin-3-yl)carbamoyl)nicotinamide (Compound E); and (c) admixing Compound E and a second base to form a product mixture comprising Compound A.

The disclosure further provides processes for synthesizing AMG 510 comprising using Compound A prepared according to the disclosed processes.

DETAILED DESCRIPTION

Provided herein are processes for preparing 7-chloro-6-fluoro-1-(2-isopropyl-4-methylpyridin-3-yl)pyrido[2,3-d]pyrimidine-2,4(1H,3H)-dione (i.e., Compound A), or a salt thereof:

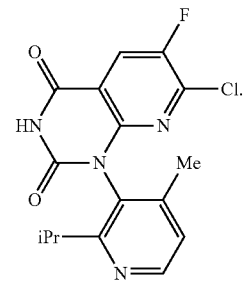

(A)

The disclosed processes for preparing Compound A, or a salt thereof, comprise (a) admixing 2-isopropyl-4-methylpyridin-3-amine (i.e., Compound B):

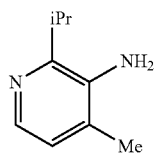

(B)

or a salt thereof, a first base, and a reactive compound comprising phosgene or a phosgene equivalent in an organic solvent to form 3-isocyanato-2-isopropyl-4-methylpyridine (i.e., Compound C):

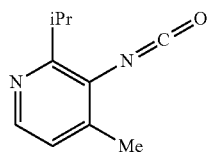

(C)

(b) admixing Compound C and 2,6-dichloro-5-fluoronicotinamide (i.e., Compound D):

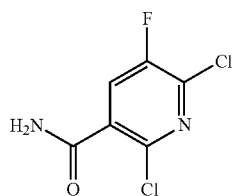

(D)

to form 2,6-dichloro-5-fluoro-N-((2-isopropyl-4-methylpyridin-3-yl)carbamoyl)nicotinamide (Compound E), or a salt thereof:

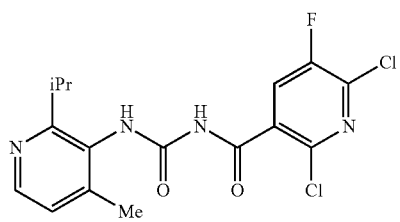

(E)

and (c) admixing Compound E or salt thereof and a second base to form a product mixture comprising Compound A.

The processes disclosed herein for preparing compound A provide several advantages over prior synthetic processes (for example, as described in U.S. Pat. No. 10,519,146, Lanman et al., *J. Med. Chem.* 2020; 63:52-65 ("Lanman"), and International Patent Application Publication Nos. WO 2020/102730, WO2021/097207 and WO2021/097212). For example, prior syntheses of Compound A proceed through an acyl-isocyanate intermediate compound of the formula:

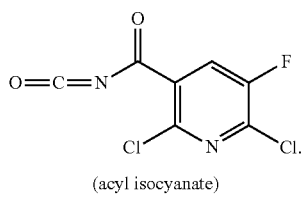 [SMILES: O=C=NC(=O)c1cc(F)c(Cl)nc1Cl]

(acyl isocyanate)

As shown in Scheme 1 below, the prior synthetic pathway to Compound A comprises activating Compound D as the acyl-isocyanate compound, which is then reacted with Compound B to provide Compound E, which in turn is converted to Compound A.

Scheme 1. Prior synthetic pathway to Compound A.

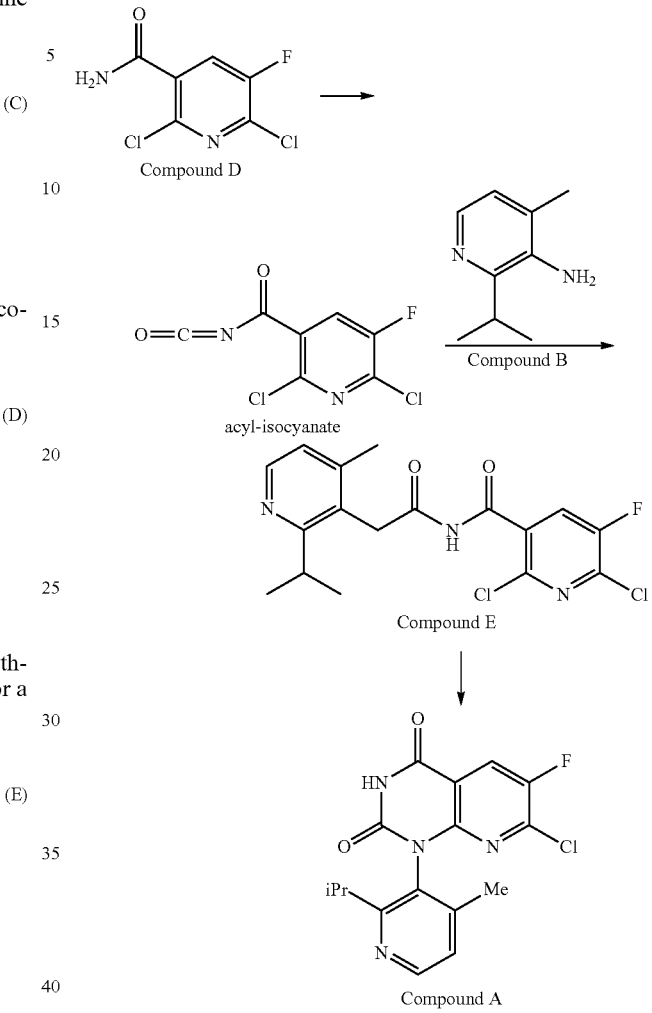

In contrast, as shown in Scheme 2 the disclosed processes comprise, inter alia, forming the aniline-derived isocyanate, Compound C:

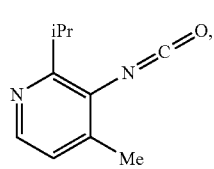

(C)

and thus, advantageously do not proceed through an acyl-isocyanate intermediate compound. Without wishing to be bound to a particular theory, eliminating the acyl-isocyanate intermediate compound, wherein the acyl carbon acts as an electrophilic site of reaction for forming undesired by-products, provides, for example, for higher yielding processes without distillations, complex workups or chromatography, such that reaction products can be isolated via direct crystallization and filtration. Specifically, the large-scale process disclosed on page 55 of WO2020/102730 generated Compound A ("Rac-dione") in 41% yield over 2 steps (Steps 2 and Step 3) based on Compound B (see also, WO2021/097207 (page 45) and WO2021/097212 (page 49). Lanman discloses a smaller scale process that uses Compound E without further purification (see Step 2 in Lanman on page 62) and generates Compound A from unpurified Compound E in quantitative yield (see Step 3 in Lanman on page 62) after chromatographic purification. In contrast, the processes disclosed herein, for example, in Example 1, provide Compound A in 75% and 80% yield based on Compound B and results in Compound A of high purity (≥99.5% by HPLC) by simple crystallization and filtration, avoiding cumbersome distillation and workup processes.

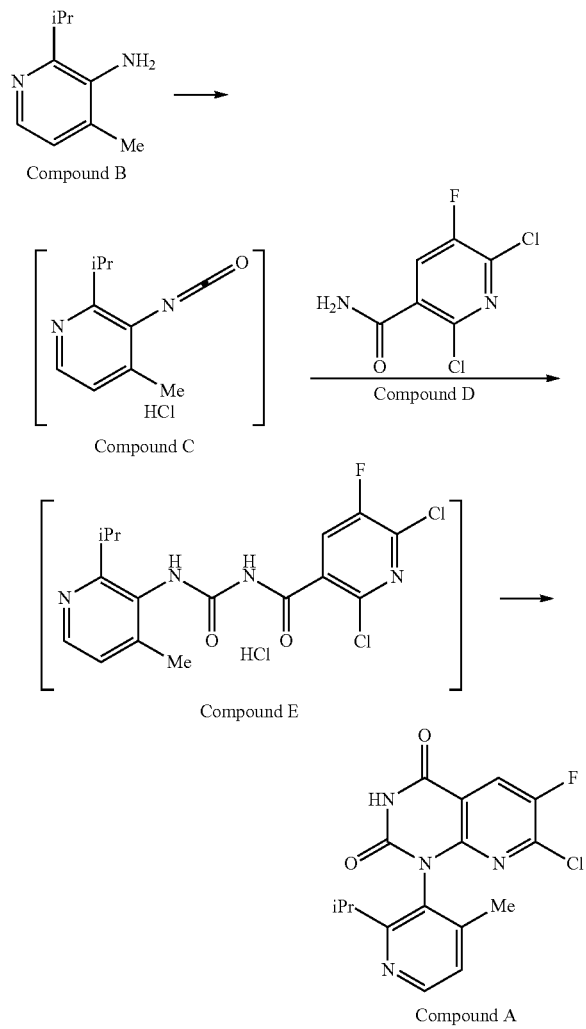

Scheme 2. Disclosed processes for preparing Compound A.

Other aspects of the disclosed processes also are advantageous. For example, the disclosed reaction conditions for admixing Compound E and a second base provide a product mixture comprising Compound A and the second base, wherein Compound A is provided in high yield and with high purity, compared to prior art processes for forming Compound A from Compound E. Prior syntheses were complicated, for example, by the presence of tert-butyl ether impurities, such as 7-(tert-butoxy)-6-fluoro-1-(2-isopropyl-4-methylpyridin-3-yl)pyrido[2,3-d]pyrimidine-2,4(1H,3H)-dione, which were generated from undesired reactivity of the sodium tert-butoxide base (see, WO2020/102730, page 55, Step 3). In contrast, the presently disclosed processes desirably can be conducted using milder bases to transform Compound E to Compound A. The use of, for example, milder and non-nucleophilic bases, such as tetramethylguanidine and 1,8-diazabicyclo[5.4.0]undec-7-ene), rather than sodium tert-butoxide to convert Compound E to Compound A, advantageously reduces the formation of undesirable side products.

Moreover, this disclosure provides, inter alia, processes that are operationally simple, requiring few unit operations (for example, sequential charging of reagents followed by temperature adjustment, no distillations, no phase-cuts, and direct isolation of Compound A from the reaction stream), and are suitable for sequential reactions in the same reaction vessel. Additionally, certain starting materials can be readily purged (for example, excess phosgene by subsurface sparge with dry nitrogen). Further, in some embodiments, the disclosed processes can be conducted without isolating any intermediate compounds, such as Compound C or Compound E, enabling certain processes provided herein to be conducted in a single reaction vessel as a "one-pot" process.

Furthermore, the disclosed processes provide a decreased environmental impact (for example, improved process "greenness") as measured by one or more of the following:

1) an improved Process Mass Intensity (PMI), wherein the cumulative mass of materials used throughout the disclosed processes is less than 20 kg per kg Compound A, a reduction as compared to prior art processes (see, for example, Step 2 and 3 as disclosed in WO2020/102730, which have a PMI of more than 115 kg per kg Compound A), achieved, for example, via an approximately 80% reduction in the amount of organic solvent used and a similar reduction in aqueous solvent usage; in some embodiments, the PMI of the processes disclosed herein is less than 115, 100, 90, 80, 70, 60, 50, 45, 40, 35, 30, 25, or 20 kg per kg Compound A;

2) reduced time and energy costs, due to, for example, an expected 50% reduction in manufacture cycle time, for example, shorter cycle times by at least a day or more (for example, 2, 3, 4, 5, 6, 7, 8, 9, or 10 days, or more) due to improved robustness of the processes that require fewer unit operations (no distillations and no work-ups) (for example, more than 50% less than the unit operations of prior synthetic processes; compare Steps 2 and 3 on page 55 of WO2020/102730 (13 Unit Operations) with the processes disclosed herein, for example, Example 1A (5 Unit Operations) and Example 1B (6 Unit Operations)) and fewer in-process tests (IPTs) (for example, 2, 3, 4, 5, 6, 7, or fewer IPTs);

3) an elimination of halogenated solvents (for example, elimination of dichloromethane in certain processes disclosed herein, for example, the processes of Example 1, whereas dichloromethane was used, for example, in the processes disclosed in WO2020/102730 (for example, Step 2 on page 55), WO2021/097207 (for example, Step 2 on page 45), and WO2021/097212 (for example, Steps 1a and 1b on page 49).

Moreover, using the disclosed processes, Compound A can be prepared at a reduced manufacturing cost on a per kilogram basis due to expected reductions in manufacturing cycle times, raw material quantities, and analytical testing. In addition, the disclosed processes have a reduced widepoint (for example, Vmax). By way of example, in some embodiments the solvent widepoint is reduced from more than 20 volumes to less than 15 volumes (L/kg) (for example, 10 volumes) with respect to Compound A. It follows then that the disclosed processes allow for larger batch sizes to be run in the same reactor volumes in less time thereby resulting in higher overall efficiencies of manufacture.

In addition, the disclosed processes provide a high yield of Compound A, based upon Compound B as a starting material-over three chemical reactions and via two intermediates. In various embodiments, the overall yield of Compound A is 50% or more, 75% or more, 80% or more relative to Compound B (for example, 55%, 60%, 65%, 70%, 75%, 76%, 77%, 78%, 79%, 80%, 81%, 82%, 83%, 84%, 85%, 86%, 87%, 88%, 89%, 90%, 91%, 92%, 93%, 94%, 95%, 96% 97%, 98%, 99%, or 100% yield relative to Compound B).

Furthermore, the disclosed processes provide Compound A in high chemical purity. In various embodiments, the chemical purity of Compound A prepared according to the disclosed processes is 90% or more, as determined by liquid chromatography. For example, in various embodiments, the chemical purity of Compound A is 91%, 92%, 93%, 94%, 95%, 96%, 97%, 98%, 99%, 99.5%, or even 99.9%, as determined by liquid chromatography.

Conversion of Compound B to Compound C

As described herein, the disclosed processes comprise forming Compound C via admixing Compound B, or a salt thereof, a first base, and a reactive compound comprising phosgene or a phosgene equivalent in an organic solvent to form Compound C.

Compound B can be a free base or a salt. In some embodiments, Compound B is a free base. In some embodiments, Compound B is present as a suitable salt, for example, a hydrochloride salt.

As used herein, "Compound" (for example, Compound A, Compound B, Compound C, Compound D, and/or Compound E) refers to a "Compound" or a salt thereof, unless explicitly described otherwise.

Nonlimiting illustrative conditions for the conversion of Compound B to Compound C include the following: a solution of Compound B (for example, 1 equiv) and a first base (for example, 1 equiv) in an anhydrous solvent (for example, 1 vol. per Compound B) is charged to a solution of the reactive compound (for example, 1.2 equiv) in anhydrous solvent (for example, 3 vol. per Compound B) while maintaining a reduced temperature. It has been discovered that at temperatures less than −40° C., the reaction slows such that unreacted Compound B can accumulate.

Without wishing to be bound to a particular theory, the conditions described herein for the conversion of Compound B to Compound C are highly selective for the formation of the desired Compound C, and provide reduced amounts of side reactions/by-products. An illustrative by-product includes the symmetrical urea compound derived from the self-coupling (for example, self-condensation) of Compound B having the following formula:

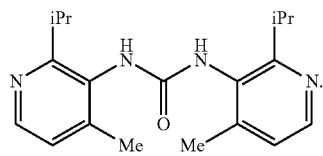

(symmetrical urea of Compound B)

In various embodiments, the conversion of Compound B to Compound C is characterized by forming less than 5% side products (for example, 4% or less, 3% or less, 2% or less, or 1 w % or less side products). In some embodiments, the disclosed processes provide a conversion of Compound B to Compound C while generating less than 1% of the symmetrical urea.

First Base

As described herein, the conversion of Compound B to Compound C comprises using a first base. The first base can be any suitable base. In various embodiments, the first base is an amine. In some embodiments, when the first base is an amine, the amine is a tertiary amine. Non-limiting examples of tertiary amines include triethylamine and N,N-diisopropylethylamine (DIPEA). In some embodiments, the tertiary amine is DIPEA.

The first base is present in a suitable amount to facilitate the conversion of Compound B to Compound C. In various embodiments, the first base is present at 0.4 molar equivalents (equiv) or more, based upon Compound B (for example, 0.5, 0.6, 0.7, 0.8, 0.9, 1, 1.1, 1.2, 1.3, 1.4, 1.5, 1.6, 1.7, 1.8, 1.9, or 2 equiv based upon Compound B). As used herein, the terms "molar equivalent" and "equivalents" are used interchangeably unless otherwise specified. In some cases, the first base is present at 1.1 equivalents or less, based upon Compound B (for example, 1.0 equiv, 0.9 equiv, or 0.8 equiv based upon Compound B). Thus, the first base is present in any amount bounded by and including the aforementioned endpoints. For example, the first base is present at 0.4 to 2 equivalents based upon Compound B, or 0.4 to 1.9 equiv, 0.5 to 1.8 equiv, 0.6 to 1.7 equiv, 0.7 to 1.6 equiv, 0.8 to 1.5 equiv, 0.9 to 1.4 equiv, 1 to 1.3 equiv, or 1.1 to 1.2 equiv based upon Compound B. In some embodiments, the first base is present in 0.4 to 1.1 equiv, 0.5 to 1.0 equiv, 0.6 to 0.9 equiv, or 0.7 to 0.8 equiv based upon Compound B.

Reactive Compound

As described herein, the conversion of Compound B to Compound C makes use of a reactive compound comprising phosgene or a phosgene equivalent. In various embodiments, the reactive compound is phosgene. In some embodiments, the reactive compound is a phosgene equivalent. In some embodiments, when the reactive compound comprises a phosgene equivalent, the phosgene equivalent is selected from trichloromethyl carbonochloridate (corresponding to two phosgene equivalents), bis(trichloromethyl)carbonate (corresponding to three phosgene equivalents), di(imidazol-1-yl)methanone, or bis(2,5-dioxopyrrolidin-1-yl) carbonate. In some embodiments, the reactive compound corresponding to three phosgene equivalents is bis(trichloromethyl) carbonate. In some embodiments, it may be advantageous to convert a reactive compound comprising multiple phosgene equivalents, such as three phosgene equivalents for bis (trichloromethyl) carbonate, to phosgene by treating the reactive compound with a suitable base. In various embodiments, the base is an amine. In some embodiments, when the base is an amine, the amine is a tertiary amine. Non-limiting examples of tertiary amines include triethylamine and N,N-diisopropylethylamine (DIPEA). In some embodiments, the tertiary amine is DIPEA. In some embodiment, the suitable base is an additional amount of the first base. In other embodiments, the suitable base is a base different from the first base. In one embodiment, the suitable base is added as a solution in an organic solvent as provided herein.

The reactive compound is present in a suitable amount to facilitate the conversion of Compound B to Compound C. For example, in some embodiments, the reactive compound, for example, phosgene or a phosgene equivalent, is present at 1.0 equivalents or more, based upon Compound B (for example, 1.2 equiv based upon Compound B). In other embodiments, the reactive compound, for example, a reactive compound corresponding to two phosgene equivalents, is present at 0.5 equivalents or more, based upon Compound B (for example, 0.6 equiv based upon Compound B). In another embodiment, the reactive compound, for example, a reactive compound corresponding to three phosgene equivalents, is present at 0.3 equivalents or more, based upon Compound B (for example, 0.4 equiv based upon Compound B). Alternatively, or in addition, the reactive compound is present at 1.8 equivalents or less, based upon Compound B (for example, 1.5 equiv based upon Compound B). Thus, the reactive compound is present in any amount bounded by and including the aforementioned endpoints. For example, the reactive compound is present at 1.0 to 1.8 equivalents based upon Compound B, or 1.2 to 1.5 equiv based upon Compound B. In some embodiments, when the reactive compound comprises phosgene, a slight excess of phosgene is used (for example, 1.2 equiv relative to Compound B).

In various embodiments, when the reactive compound comprises phosgene, residual phosgene can be removed from the reaction mixture using any suitable method. In various embodiments, residual phosgene is removed from the reaction mixture via subsurface sparge with dry nitrogen.

Reaction Temperature

The reaction temperature is controlled during the conversion of Compound B to Compound C. In some embodiments, Compound B, the first base, and the reactive compound are admixed while maintaining a reaction temperature of room temperature (for example, 15-25° C.).

In some embodiments, Compound B, the first base, and the reactive compound are admixed while maintaining a reaction temperature not more than 0° C. In various embodiments, Compound B, the first base, and the reactive compound are admixed while maintaining a reaction temperature of −35° C. to 0° C. (for example, −30° C., −25° C., −20° C., −15° C., −10° C., or −5° C.) for a period of time prior to warming to, for example, room temperature. For example, in some embodiments, the lowered reaction temperature is maintained for a period of at least 15 minutes prior to warming to 25° C.

Organic Solvent

The organic solvent can be any suitable organic solvent. In some embodiments, the organic solvent is selected from the group consisting of dimethylsulfoxide (DMSO), N-methyl-2-pyrrolidone (NMP), tetrahydrofuran, 2-methyltetrahydrofuran, dioxane, methyl tert-butyl ether, cyclopentyl methyl ether, toluene, and a combination thereof. In various embodiments, in conjunction with other embodiments above or below, the organic solvent is a polar organic solvent. In some embodiments, in conjunction with other embodiments above or below, the organic solvent is a polar aprotic solvent. Nonlimiting illustrative polar aprotic organic solvents include, for example, haloalkanes (for example, dichloromethane, dichloroethane), dioxanes (for example, 1,4-dioxane), dimethoxyethane, N-methylpyrrolidone, tetrahydrofuran, ethyl acetate, isopropyl acetate, tetrahydrofuran, 2-methyltetrahydrofuran, acetone, dimethylformamide, acetonitrile, dimethylsulfoxide, and propylene carbonate. In various embodiments, the organic solvent is anhydrous. In some embodiments, the organic solvent comprises a solvent selected from the group consisting of acetonitrile, dichloromethane, dichloroethane, dimethoxyethane, isopropyl acetate, toluene, tetrahydrofuran, 2-methyltetrahydrofuran, 1,4-dioxane, and a combination thereof. In some cases, the organic solvent comprises a solvent selected from the group consisting of 2-methyltetrahydrofuran, toluene, acetonitrile, NMP, DMSO, sulfolane, and a combination thereof. In some cases, the organic solvent comprises acetonitrile. In some more specific cases, the organic solvent comprises anhydrous acetonitrile. In some embodiments, the solvent is not a halogenated solvent, such as dichloromethane, but a non-halogenated solvent, such as acetonitrile.

Conversion of Compound C to Compound E

As described herein, the disclosed processes for preparing Compound A comprise converting Compound C to Compound E by admixing Compound C with Compound D.

Nonlimiting illustrative conditions for the conversion of Compound C to Compound E include admixing Compound C with a slight excess of Compound D (for example, 1.1 equiv) as a solid or optionally with a 0.5 volume solvent rinse to facilitate the addition of Compound D and heating the mixture (for example, greater than 25° C., such as 60 to 80° C. or 80° C.) overnight (for example, 12 to 16 hours) or until full conversion of Compound C to E as determined by, for example, HPLC. In one embodiment, reaction progress can be monitored by, for example, a) extracting a sample, b) quenching with methanol, and c) analyzing for methanol adduct (i.e., methyl carbamate of Compound B):

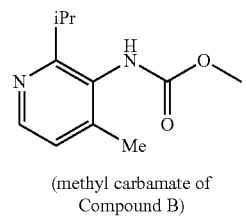

(methyl carbamate of Compound B)

In some embodiments, Compound E or a salt thereof can be isolated by filtration, rinsed with solvent (for example, acetonitrile) and dried under nitrogen to provide Compound E or salt thereof. In various embodiments, when Compound E is isolated, Compound E is formed in a yield of 85% or more relative to Compound B (for example, 86%, 87%, 88%, 89%, 90%, 91%, 92% or more relative to Compound B). In some embodiments, the yield of Compound E is 85% to 92% relative to Compound B. In some embodiments, the yield of Compound E is 86% relative to B.

The disclosed processes for converting Compound C to Compound E advantageously maximize the conversion of Compound C. For example, in various embodiments, upon completion of converting Compound C to Compound E less than 0.2% of Compound C remains.

The admixing of Compound C and Compound D is conducted at a suitable temperature. In some embodiments, in conjunction with other embodiments above or below, the admixing of Compound C with Compound D is performed at a temperature from room temperature to 120° C. (for example, 15° C., 20° C., 25° C., 30° C., 35° C., 40° C., 45° C., 50° C., 55° C., 60° C., 65° C., 70° C., 75° C., 80° C., 85° C., 90° C., 95° C., 100° C., 105° C., 110° C., or 115° C., or 25 to 60 C, 50 to 120° C., 60 to 100° C., or 50 to 90° C.), In various embodiments, the admixing of Compound C with Compound D is performed at a temperature of 60° C. or more (for example, 61° C., 62° C., 63° C., 64° C., 65° C., 66° C., 67° C., 68° C., 69° C., or 70° C. or more). Alternatively, or in addition, the admixing of Compound C with Compound D is performed at a temperature of 80° C. or less (for example, 79° C., 78° C., 77° C., 76° C., 75° C., 74° C., 73° C., 72° C., or 71° C. or less). Accordingly, the admixing of Compound C with Compound D is performed at a temperature bounded by and including any of the aforementioned endpoints, for example, 15 to 120° C., 20 to 115° C., 25 to 110° C., 30 to 105° C., 35 to 100° C., 40 to 95° C., 45 to 90° C., 50 to 85° C., 55 to 80° C., 60 to 80° C., 61 to 79° C., 62 to 78° C., 63 to 77° C., 64 to 76° C., 65 to 75° C., 66 to 74° C., 67 to 73° C., 68 to 72° C., or 69 to 71° C.

A suitable amount of Compound D is used. Typically, at least 1 equiv or more of Compound D is used. In various embodiments, a slight excess (for example, 1.1 equiv) of Compound D relative to the amount of Compound B is used. The slight excess is based upon starting amount of Compound B, as Compound C is not isolated or calculated, but taken on directly after formation from Compound B to reaction with Compound D. In various embodiments, 1.1 equiv of Compound D (relative to Compound B) is admixed with Compound C to form Compound E.

In some embodiments, the disclosed processes further comprise drying Compound D prior to use in the reaction. In embodiments when Compound D is dried, Compound D is dried to a water content of less than 200 ppm prior to admixing with Compound C. In some embodiments, Compound D is dried to have a water content of 190 ppm or less, for example, 180 ppm or less, 170 ppm or less, 160 ppm or less, 150 ppm or less, 140 ppm or less, 130 ppm or less, 120 ppm or less, 110 ppm or less, 100 ppm or less, 90 ppm or less, 80 ppm or less, 70 ppm or less, 60 ppm or less, 50 ppm or less, 40 ppm or less, 30 ppm or less, 20 ppm or less, 10 ppm or less, 5 ppm or less, 4 ppm or less, 3 ppm or less, 2 ppm or less, 1 ppm or less, or 0 ppm.

Conversion of Compound E to Compound A

As described herein, the disclosed processes for preparing Compound A comprise converting Compound E to Compound A by admixing Compound E and a second base to form a product mixture comprising Compound A and the second base.

As shown in Scheme 3, Compound E can react kinetically via at least two different pathways, namely, a substitution reaction pathway (SNAr) (having a reaction rate of $k_{SNAr}$) and a fragmentation pathway (having a reaction rate of $k_{Frag}$), wherein it is the SNAr pathway that provides Compound A and the fragmentation pathway that results in undesirable side-reactions.

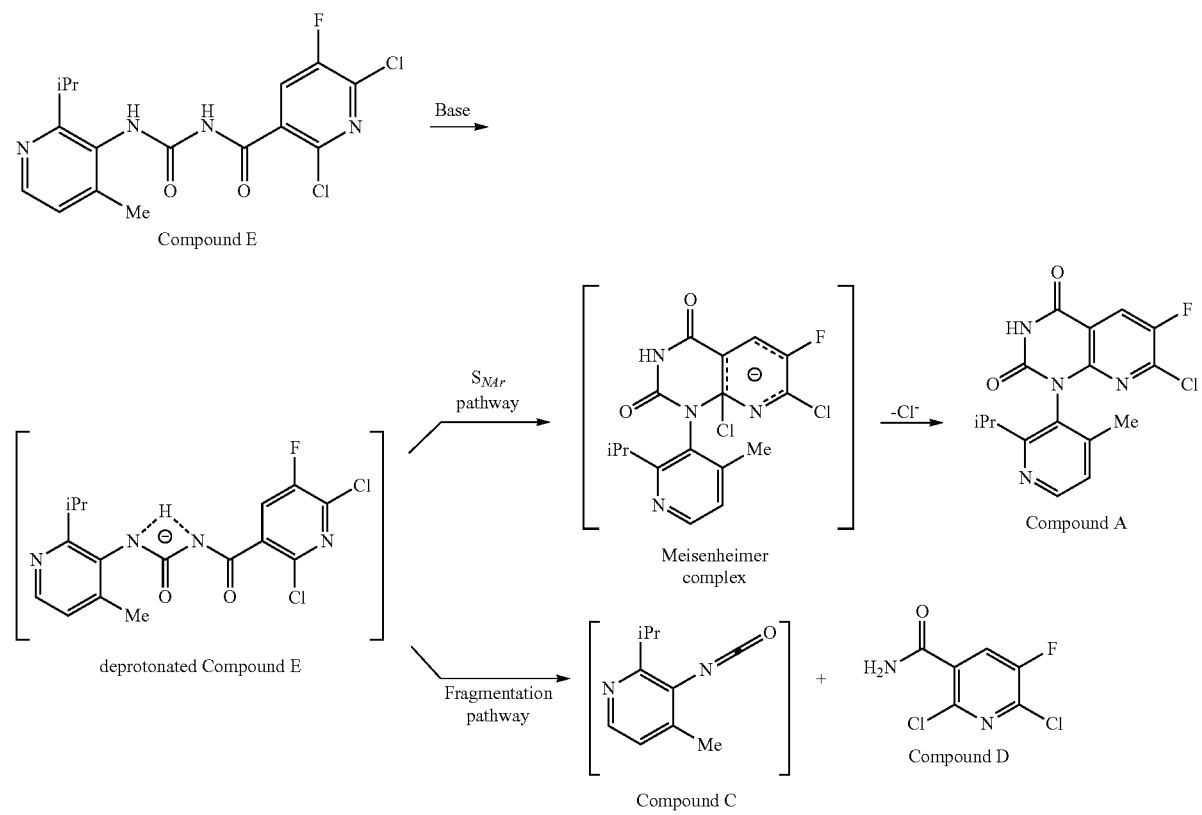

Scheme 3. Kinetic pathways for reactions of Compound E.

Without wishing to be bound to any particular theory, the $k_{SNAr}/k_{Frag}$ selectivity is expected to increase with dielectric constant and decrease with increasing reaction temperature. The processes of the present disclosure desirably exhibit a high selectivity for the SNAr pathway.

Nonlimiting illustrative conditions for the conversion of Compound E to Compound A include the following: cooling a mixture of Compound E or salt thereof in a solvent (for example, acetonitrile) to 25° C. or less or 17° C. or less (for example, −5 to 25° C., −5 to 20° C., −5 to 15° C., −5 to 10° C., −5 to 5° C., −5 to 0° C., 0 to 25° C., 0 to 20° C., 0 to 15° C., 0 to 10° C., 5 to 25° C., 5 to 20° C., 5 to 15° C., 5 to 10° C., 12 to 20° C., 20° C.) and adding an excess of the second base (for example, 2 to 10 equiv), maintaining the reaction mixture during addition of the second base and afterwards to a temperature of 12 to 20° C., for example, 15 to 17° C., 17° C. or 20° C. The reaction mixture is stirred after addition of the second base for 24 h or until completion as evidenced by, for example, HPLC, at a temperature of 12 to 20° C., for example, 15 to 17° C. In some cases, Compound E or a salt thereof is present in a solution with a solvent (for example, DMSO) for the admixing with TMG. Use of a solution of Compound E or salt thereof in a solvent (for example, DMSO) can provide faster reaction times, fewer impurities, and/or higher yield.

Second Base

The second base is any suitable base. In some embodiments, the second base comprises 1,5,7-triazabicyclo(4.4.0) dec-5-ene (TBD), 7-methyl-1,5,7-triazabicyclo(4.4.0)dec-5-ene (MTBD), 1,8-diazabicyclo[5.4.0]undec-7-ene (DBU), 1,5-diazabicyclo[4.3.0]non-5-ene (DBN), 1,1,3,3-tetramethylguanidine (TMG), or a combination thereof. In one embodiment, the second base comprises TMG. In another embodiment, the second base comprises DBU.

The second base is present in a suitable amount. In some embodiments, in conjunction with above or below embodiments, the second base is present at 2 equivalents or more (for example, 2.5, 3, 3.5, 4, 4.5, or 5 or more equiv). Alternatively, or in addition, the second base is present at 10 equivalents or less (for example, 9.5, 9, 8.5, 8, 7.5, 7, 6.5, 6, or 5.5 or less equiv). Thus, the second base can be present in an amount bounded by any of the aforementioned values, for example, 2 to 10 equiv, 2.5 to 9.5 equiv, 3 to 9 equiv, 3.5 to 8.5 equiv, 4 to 8 equiv, 4.5 to 7.5 equiv, 4.5 to 6.5 equiv, 5 to 7 equiv, or 5.5 to 6.5 equiv of second base. In one embodiment, the second base can be present at 4.5 equiv. In another embodiment, the second base can be present at 6.0 equiv.

In embodiments wherein Compound E is treated to reduce impurities (for example, when Compound E is isolated), Compound A can be obtained from Compound E using 2 equiv of second base or more (for example, 2.1, 2.2, 2.3, 2.4, 2.5, 2.6, 2.7, 2.8, 2.9, or 3 equiv or more). Without wishing to be bound to a particular theory, it is believed that lowering the amount of impurities in the reaction mixture for converting Compound E to Compound A allows for a lower amount of second base to be used in the conversion. In various embodiments, in conjunction with other embodiments above or below, the second base is present at 4.5 equivalents or more, based on Compound E, for example, 4.6 equiv, 4.7 equiv, 4.8 equiv, 4.9 equiv, 5.0 equiv, 5.1 equiv, 5.2 equiv, 5.3 equiv, 5.4 equiv, or 5.5 equiv or more, based on Compound E. Alternatively, or in addition to the second base is present at 6.5 equivalents or less, based on Compound E, for example, 6.4 equiv, 6.3, 6.2, 6.1, 6.0, 5.9, 5.8, 5.7, or 5.6 equiv or less, based on Compound E. Thus, in various embodiments, the second base is present in an amount bounded by, and including, any of the two aforementioned endpoints, for example, 2 to 10 equiv, 2.5 to 9.5 equiv, 3 to 9 equiv, 3.5 to 8.5 equiv, 4 to 8 equiv, 4.5 to 7.5 equiv, 4.5 to 6.5 equiv, 5 to 7 equiv, or 5.5, to 6.5 equiv of second base. Further, in some embodiments the second base is present in an 4.5 to 6.5 equiv, 4.6 to 6.4 equiv, 4.7 to 6.3 equiv, 4.8 to 6.2 equiv, 4.9 to 6.1 equiv, 5.0 to 6.0 equiv, 5.1 to 5.9 equiv, 5.2 to 5.8 equiv, 5.3 to 5.7 equiv, or 5.4 to 5.6 equiv based on Compound E. In some embodiments, the second base is present in 4.8 to 5.2 equiv based on Compound E.

In some embodiments the second base is added to Compound E while maintaining a temperature of 25° C. or less (for example, 24° C., 23° C., 22° C., 21° C., 20° C., 19° C., 18° C., 17° C., 16° C., or 15° C. or less, or 12 to 20° C. In some embodiments, the second base is added to Compound E while maintaining a temperature of 15 to 17° C. In various embodiments, the temperature is adjusted to 15 to 17° C. after the addition of the second base at a temperature of 25° C. or less (for example, 12 to 20° C.).

In some embodiments, the conversion of Compound E to Compound A is conducted in a suitable solvent. Illustrative solvents for the conversion of Compound E to Compound A include dimethylsulfoxide (DMSO), N-methyl-2-pyrrolidine, 2-methyltetrahydrofuran, tetrahydrofuran, and acetonitrile. In some embodiments, the conversion of Compound E to Compound A is conducted in a solvent comprising DMSO. The solvent is present in a suitable amount (for example, 4 volumes). In some embodiments, the conversion of Compound E to A is conducted in a solvent comprising acetonitrile. In one embodiment, the solvent is anhydrous, such as anhydrous acetonitrile.

As used herein, a "volume" of liquid (for example, solvent) refers to an amount of solvent (mL) per mass (g) of solid. By way of example, adding 21 mL of a solvent to 7 g of solid is adding "3 volumes" of solvent.

As described herein, the conversion of Compound E to Compound A is advantageously unaffected by the presence alcohols. By way of example, the presence of alcohols such as, for example, n-butanol, isobutanol, sec-butanol, tert-butanol, propanol, isopropanol, ethanol, methanol, or a combination thereof does not substantively impact the conversion of Compound E to Compound A.

In some embodiments, the disclosed processes further comprise crystallizing Compound A from the product mixture. In various embodiments, Compound A is crystallized from the product mixture by adding an aqueous solution of an acid. Suitable acids for crystallizing Compound A include, for example, phosphoric acid, citric acid, sulfuric acid, tartaric acid, and hydrochloric acid. In some embodiments, 6M phosphoric acid is used to crystallize Compound A from the product mixture. In some embodiments, 6M phosphoric acid is used to crystallize Compound A from the product mixture at a temperature of not more than 20° C., wherein crystallized Compound A is isolated via filtration. In some embodiments, 6M phosphoric acid is used to crystallize Compound A from the product mixture at a temperature of not more than 25° C., wherein crystallized Compound A is isolated via filtration. In some embodiments, 4.5M phosphoric acid is used to crystallize Compound A from the product mixture at a temperature of not more than 20° C., wherein crystallized Compound A is isolated via filtration.

In embodiments, when Compound A is crystallized, the processes can further comprise isolating the crystallized Compound A. In some embodiments, the crystallized Compound A is isolated by filtration.

Compound A to Compound F

Compound A, prepared by the processes disclosed herein, can be used to synthesize Compound F, via a manner similar to that disclosed in, for example, U.S. Pat. No. 10,519,146. As such, in some embodiments, the disclosed processes for preparing Compound A further comprise using Compound A to synthesize Compound F, a pharmaceutically acceptable salt, atropisomer, or a pharmaceutically acceptable salt of an atropisomer thereof.

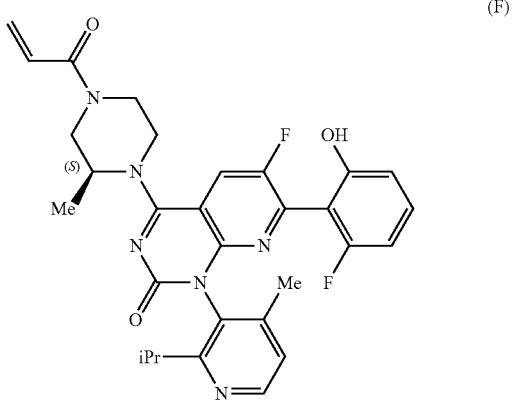

(F)

Embodiments

1. A process of preparing compound A

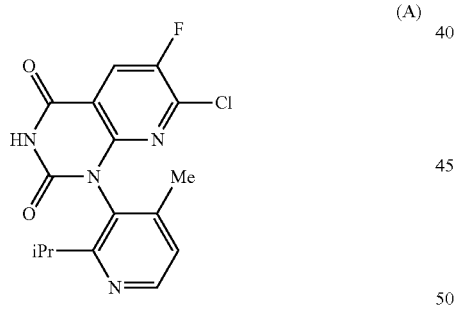

(A)

comprising:
(a) admixing 2-isopropyl-4-methylpyridin-3-amine (Compound B), or a salt thereof, a first base, and a reactive compound comprising phosgene or a phosgene equivalent in an organic solvent to form 3-isocyanato-2-isopropyl-4-methylpyridine (Compound C);
(b) admixing Compound C and 2,6-dichloro-5-fluoronicotinamide (Compound D) to form 2,6-dichloro-5-fluoro-N-((2-isopropyl-4-methylpyridin-3-yl)carbamoyl)nicotinamide (Compound E); and
(c) admixing Compound E and a second base to form a product mixture comprising Compound A.
2. The process of embodiment 1, wherein step (a) comprises adding Compound B, or a salt thereof, and the first base to Solution X comprising the reactive compound and the organic solvent.

3. The process of embodiment 2, wherein in step (a) the Compound B, or a salt thereof, and the first base are added as Solution Y comprising the Compound B, or a salt thereof, the first base and the organic solvent to the Solution A.
4. The process of embodiment 2 or embodiment 3, wherein the Solution X, prior to the addition of Compound B, or a salt thereof, and the first base, further comprises an additional amount of the first base.
5 The process of embodiment 4, wherein the Solution X, prior to the addition of Compound B, or a salt thereof, and the first base, is prepared by adding the additional amount of the first base to a solution comprising the reactive compound and the organic solvent.
6. The process of embodiment 5, wherein the additional amount of the first base is added as a solution comprising the additional amount of the first base and the organic solvent.
7. The process of embodiment 2 or 3, wherein the temperature of Solution X is kept at a temperature of up to 0° C.
8 The process of any one of embodiments 2-6, wherein the temperature of Solution X is kept at a temperature of −10° C. to 0° C.
9. The process of any one of embodiments 2-6, wherein the temperature of Solution X is kept at a temperature of −7° C. to −3° C.
10. The process of any one of embodiments 2-6, wherein the temperature of Solution X is kept at a temperature of −5° C.
11. The process of any one of embodiments 1-3, wherein step (a) comprises admixing at a temperature of −35° C. to 0° C. for at least 15 minutes, then warming to 25° C.
12. The process of any one of embodiments 1-11, wherein Compound B is a free base.
13. The process of any one of embodiments 1-12, wherein the first base is an amine.
14. The process of embodiment 13, wherein the amine is a tertiary amine.
15. The process of embodiment 14, wherein the tertiary amine is N,N-diisopropylethylamine.
16. The process of any one of embodiments 1-3, wherein the first base is present at 0.8 to 1.2 molar equivalents, based upon Compound B.
17. The process of any one of embodiments 1-3, wherein the first base is present at 0.9 to 1.1 molar equivalents, based upon Compound B.
18. The process of any one of embodiments 1-3, wherein the first base is present at 1.0 molar equivalents, based upon Compound B.
19. The process of embodiment 4, wherein the additional amount of the first base in Solution X, prior to the addition of Compound B, or a salt thereof, and the first base, is present at 0.01 to 0.02 molar equivalents, based upon Compound B.
20 The process of embodiment 4, wherein the additional amount of the first base in Solution X, prior to the addition of Compound B, or a salt thereof, and the first base, is present at 0.0175 molar equivalents, based upon Compound B.
21. The process of any one of embodiments 1-20, wherein the reactive compound is phosgene.
22. The process of any one of embodiments 1-20, wherein the reactive compound is a phosgene equivalent.
23. The process of embodiment 22, wherein the phosgene equivalent is trichloromethyl carbonochloridate, bis (trichloromethyl)carbonate, di(imidazol-1-yl)methanone, or bis(2,5-dioxopyrrolidin-1-yl) carbonate.

24. The process of embodiment 23, wherein the phosgene equivalent is bis(trichloromethyl)carbonate.

25. The process of any one of embodiments 1-22, wherein the reactive compound is present at 1.0 to 1.8 molar equivalents, based upon Compound B.

26. The process of any one of embodiments 1-22, wherein the reactive compound is present at 1.0 to 1.4 molar equivalents, based upon Compound B.

27. The process of any one of embodiments 1-22, wherein the reactive compound is present at 1.2 molar equivalents, based upon Compound B.

28. The process of any one of embodiments 1-22, wherein the reactive compound is present at 1.1 molar equivalents, based upon Compound B.

29. The process of embodiment 24, wherein the bis(trichloromethyl)carbonate is present at 0.3 to 0.6 molar equivalents, based upon Compound B.

30. The process of embodiment 24, wherein the bis(trichloromethyl)carbonate is present at 0.4 molar equivalents, based upon Compound B.

31. The process of embodiment 24, wherein the bis(trichloromethyl)carbonate is present at 0.37 molar equivalents, based upon Compound B.

32. The process of any one of embodiments 1-31, wherein the organic solvent of step (a) is a polar organic solvent, optionally anhydrous.

33. The process of embodiment 32, wherein the polar organic solvent comprises anhydrous acetonitrile.

34. The process of any one of embodiments 1-31, wherein the organic solvent comprises a solvent selected from the group consisting of 2-methyltetrahydrofuran, toluene, acetonitrile, NMP, DMSO, and sulfolane.

35. The process of any one of embodiments 1-32 and 34, wherein step (b) is performed at a temperature of 60° C. to 100° C.

36. The process of any one of embodiments 1-34, wherein step (b) is performed at a temperature of 60° C. to 80° C.

37. The process of any one of embodiments 1-34, wherein step (b) is performed at a temperature of 70° C. to 80° C.

38. The process of any one of embodiments 1-34, wherein step (b) is performed at a temperature of 75° C. to 80° C.

39. The process of any one of embodiments 1-34, wherein step (b) is performed at 80° C.

40. The process of any one of embodiments 1-39, wherein Compound D is present at 0.9 to 1.3 molar equivalents, based upon Compound B.

41. The process of any one of embodiments 1-39, wherein Compound D is present at 1.0 to 1.2 molar equivalents, based upon Compound B.

42. The process of any one of embodiments 1-39, wherein Compound D is present at 1.1 molar equivalents, based upon Compound B.

43. The process of any one of embodiments 1-42, further comprising drying Compound D to a water content of less than 200 ppm prior to performing step (b).

44. The process of any one of embodiments 1-19, wherein step (c) comprises adding the second base to Compound E while maintaining a temperature of 25° C. or less.

45. The process of embodiment 44, wherein the temperature is maintained at 12° C. to 20° C.

46. The process of embodiment 44 or 45, wherein, after addition of the second base, the temperature is adjusted to 15° C. to 50° C.

47. The process of embodiment 44 or 45, wherein, after addition of the second base, the temperature is adjusted to 12° C. to 17° C.

48. The process of embodiment 44 or 45, wherein, after addition of the second base, the temperature is adjusted to 20° C.

49. The process of any one of embodiments 1-48, wherein the second base comprises 1,5,7-triazabicyclo(4.4.0)dec-5-ene (TBD), 7-methyl-1,5,7-triazabicyclo(4.4.0)dec-5-ene (MTBD), 1,8-diazabicyclo[5.4.0]undec-7-ene (DBU), 1,5-diazabicyclo[4.3.0]non-5-ene (DBN), 1,1,3,3-tetramethylguanidine (TMG), or a combination thereof.

50. The process of any one of embodiments 1-49, wherein the second base comprises TMG.

51. The process of any one of embodiments 1-49, wherein the second base comprises DBU.

52. The process of any one of embodiments 1-51, wherein the second base is present in 2 to 10 molar equivalents, based upon Compound B.

53. The process of any one of embodiments 1-51, wherein the second base is present in 4 to 7 molar equivalents, based upon Compound B.

54. The process of any one of embodiments 1-51, wherein the second base is present in 4.5 to 6.5 molar equivalents, based upon Compound B.

55. The process of any one of embodiments 1-51, wherein the second base is present in 5.5 to 6.5 molar equivalents, based upon Compound B.

56. The process of any one of embodiments 1-51, wherein the second base is present in 5.8 to 6.2 molar equivalents, based upon Compound B.

57. The process of any one of embodiments 1-51, wherein the second base is present in 6.0 molar equivalents, based upon Compound B.

58. The process of any one of embodiments 1-51, wherein the second base is present in 4.0 to 5.0 molar equivalents, based upon Compound B.

59. The process of any one of embodiments 1-51, wherein the second base is present in 4.3 to 4.7 molar equivalents, based upon Compound B.

60. The process of any one of embodiments 1-51, wherein the second base is present in 4.5 molar equivalents, based upon Compound B.

61. The process of any one of embodiments 1-60, further comprising crystallizing Compound A from the product mixture by adding an aqueous solution of an acid.

62. The process of embodiment 61, wherein the acid is present in 3.0 to 7.0 molar equivalents, based upon Compound B.

63. The process of embodiment 61, wherein the acid is present in 5.5 to 6.5 molar equivalents, based upon Compound B.

64. The process of embodiment 61, wherein the acid is present in 5.8 to 6.2 molar equivalents, based upon Compound B.

65. The process of embodiment 61, wherein the acid is present in 6.0 molar equivalents, based upon Compound B.

66. The process of embodiment 61, wherein the acid is present in 4.0 to 5.0 molar equivalents, based upon Compound B.

67. The process of embodiment 61, wherein the acid is present in 4.3 to 4.7 molar equivalents, based upon Compound B.
68. The process of embodiment 61, wherein the acid is present in 4.5 molar equivalents, based upon Compound B.
69. The process of any one of embodiments 61-68, wherein the acid is phosphoric acid.
70. The process of embodiment 69, wherein the aqueous solution comprises 3 to 6 molar phosphoric acid.
71. The process of embodiment 69, wherein the aqueous solution comprises 6 molar phosphoric acid.
72. The process of embodiment 69, wherein the aqueous solution comprises 4 to 5 molar phosphoric acid.
73. The process of embodiment 69, wherein the aqueous solution comprises 4.3 to 4.7 molar phosphoric acid.
74. The process of embodiment 69, wherein the aqueous solution comprises 4.5 molar phosphoric acid.
75. The process of any one of embodiments 61-74, further comprising isolating the crystalized Compound A by filtration.
76. The process of any one of embodiments 1-75, wherein Compound C or Compound E, or any combination thereof, are not isolated prior to subsequent reaction(s).
77. The process of any one of embodiments 1-76, further comprising using Compound A to synthesize Compound F:

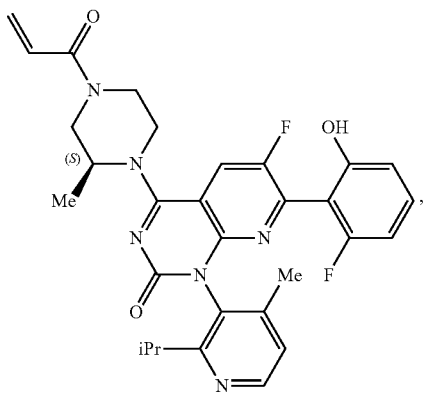

a pharmaceutically acceptable salt, atropisomer, or a pharmaceutically acceptable salt of an atropisomer thereof.

Further provided herein is the following alternative set of embodiments:

1. A process of preparing compound A

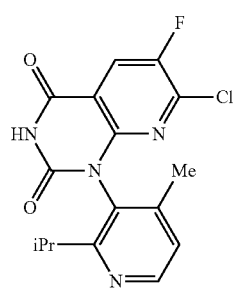

comprising:
(a) admixing 2-isopropyl-4-methylpyridin-3-amine (Compound B), or a salt thereof, a first base, and a reactive compound comprising phosgene or a phosgene equivalent in an organic solvent to form 3-isocyanato-2-isopropyl-4-methylpyridine (Compound C);
(b) admixing Compound C and 2,6-dichloro-5-fluoronicotinamide (Compound D) to form 2,6-dichloro-5-fluoro-N-((2-isopropyl-4-methylpyridin-3-yl)carbamoyl)nicotinamide (Compound E); and
(c) admixing Compound E and a second base to form a product mixture comprising Compound A and the second base.
2. The process of embodiment 1, wherein step (a) comprises adding Compound B, or a salt thereof, and the first base to a solution of the reactive compound and the organic solvent.
3. The process of embodiment 2, wherein Compound A, or a salt thereof, and the first base is added to the solution of reactive compound while maintaining a temperature of up to 0° C.
4. The process of any one of embodiments 1-3, wherein step (a) comprises admixing at a temperature of −35° C. to 0° C. for at least 15 minutes, then warming to 25° C.
5. The process of any one of embodiments 1-4, wherein Compound A is a free base.
6. The process of any one of embodiments 1-5, wherein the first base is an amine.
7. The process of embodiment 6, wherein the amine is a tertiary amine.
8. The process of embodiment 7, wherein the tertiary amine is N,N-diisopropylethylamine.
9 The process of any one of embodiments 1-8, wherein the first base is present at 0.4 to 1.1 molar equivalents, based upon Compound B.
10. The process of any one of embodiments 1-9, wherein the reactive compound is phosgene.
11. The process of any one of embodiments 1-9, wherein the reactive compound is a phosgene equivalent.
12. The process of embodiment 11, wherein the phosgene equivalent is trichloromethyl carbonochloridate, bis(trichloromethyl)carbonate, di(imidazol-1-yl)methanone, or bis(2,5-dioxopyrrolidin-1-yl) carbonate.
13. The process of embodiment 12, wherein the phosgene equivalent is bis(trichloromethyl)carbonate.
14. The process of any one of embodiments 1-13, wherein the reactive compound is present at 0.3 to 0.6 molar equivalents, based upon Compound B.
15. The process of any one of embodiments 1-14, wherein the organic solvent of step (a) is a polar organic solvent, optionally anhydrous.
16. The process of embodiment 15, wherein the polar organic solvent comprises anhydrous acetonitrile.
17. The process of any one of embodiments 1-14, wherein the organic solvent comprises a solvent selected from the group consisting of 2-methyltetrahydrofuran, toluene, acetonitrile, NMP, DMSO, and sulfolane.
18. The process of any one of embodiments 1-17, wherein step (b) is performed at a temperature of 60° C. to 80° C.
19. The process of any one of embodiments 1-18, further comprising drying Compound D to a water content of less than 200 ppm prior to performing step (b).
20. The process of any one of embodiments 1-19, wherein step (c) comprises adding the second base to Compound E while maintaining a temperature of 25° C. or less.

21. The process of embodiment 20, wherein the temperature is maintained at 12° C. to 20° C.
22. The process of embodiment 20 or 21, wherein, after addition of the second base, the temperature is adjusted to 15° C. to 50° C.
23. The process of any one of embodiments 1-22, wherein the second base comprises 1,5,7-triazabicyclo(4.4.0)dec-5-ene (TBD), 7-methyl-1,5,7-triazabicyclo(4.4.0)dec-5-ene (MTBD), 1,8-diazabicyclo[5.4.0]undec-7-ene (DBU), 1,5-diazabicyclo[4.3.0]non-5-ene (DBN), 1,1,3,3-tetramethylguanidine (TMG), or a combination thereof.
24. The process of embodiment 23, wherein the second base comprises TMG.
25. The process of any one of embodiments 1-24, wherein the second base is present in 2 to 10 molar equivalents, based upon Compound E.
26. The process of any one of embodiments 1-25, wherein the second base is present in 4.5 to 6.5 molar equivalents, based upon Compound E.
27. The process of embodiment 26, wherein the second base is present at a molar equivalent of 4.8 to 5.2, based upon Compound E.
28. The process of any one of embodiments 1-27, wherein step (c) is performed in dimethylsulfoxide (DMSO).
29. The process of any one of embodiments 1-25, further comprising crystallizing Compound A from the product mixture by adding an aqueous solution of an acid.
30. The process of embodiment 29, wherein the acid is phosphoric acid.
31. The process of embodiment 30, wherein the aqueous solution comprises 6 molar phosphoric acid.
32. The process of any one of embodiments 29-31, further comprising isolating the crystalized Compound A by filtration.
33. The process of any one of embodiments 1-32, wherein Compound C, Compound D, Compound E, or any combination thereof, are not isolated prior to subsequent reaction(s).
34. The process of embodiment 33, wherein the organic solvent comprises acetonitrile.
35. The process of any one of embodiments 1-32, wherein Compound E is isolated prior to step (c).
36. The process of any one of embodiments 1-35, further comprising using Compound A to synthesize Compound F:

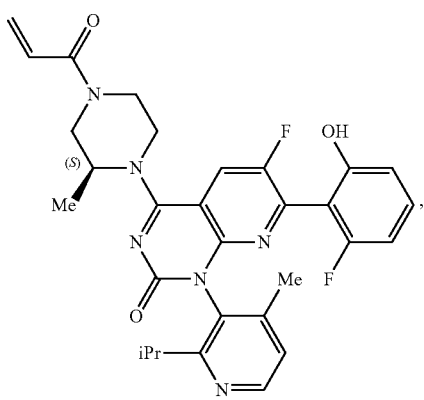

(F)

a pharmaceutically acceptable salt, atropisomer, or a pharmaceutically acceptable salt of an atropisomer thereof.

EXAMPLES

The following examples further illustrate the disclosed tablet formulation and process, but of course, should not be construed as in any way limiting its scope.

The following abbreviations are used herein: HPLC refers to high performance liquid chromatography; IPC refers to in-process control; UV refers to ultraviolet; ACN refers to acetonitrile; DBU refers to 1,8-diazabicyclo[5.4.0]undec-7-ene; MeTHF refers to 2-methyltetrahydrofuran; NMP refers to N-methyl-2-pyrrolidone; DMSO refers to dimethylsulfoxide; DMA refers to dimethylacetamide; DMF refers to dimethylformamide; TOL refers to toluene; TMG refers to tetramethylguanidine; DIPEA refers to diisopropylethylamine; EOR refers to end of reaction; and & refers to dielectric constant.

HPLC Methods

High performance liquid chromatography (HPLC) was used for determination of reaction completion and to identify reaction product(s). A nonlimiting illustrative procedure for preparing in-process control (IPC) samples used herein is as follows: reaction mixture was quenched using anhydrous methanol (1:1) in a nitrogen purged flask and an aliquot (for example, 250 μL) of the quenched reaction mixture was transferred into a 5 ml nitrogen purged volumetric flask pre-filled with anhydrous methanol and mixed well.

Samples were analyzed using HPLC. Nonlimiting illustrative HPLC conditions used herein include the following conditions listed in Tables 1A and 1B.

TABLE 1A

Illustrative HPLC conditions

| | |
|---|---|
| HPLC system | Agilent 1100/1200 |
| Column | Agilent Poroshell HPH C18, 100 Å (4.6 × 150 mm, 2.7 μm) |
| Mobile Phase A | 20 mM ammonium formate in water |
| Mobile Phase B | Acetonitrile |
| Column temperature | 21° C. |
| Flow rate | 0.9 mL/min |
| Injection volume | 5 μL |
| Acquisition time | 24 min |
| UV detection | 256 nm |

| | Gradient | | |
|---|---|---|---|
| Elution profile: | Time (min) | % A | % B |
| | 0.0 | 95 | 5 |
| | 17.0 | 35 | 65 |
| | 17.1 | 10 | 90 |
| | 20.0 | 10 | 90 |
| | 20.1 | 95 | 5 |
| | 24.0 | 95 | 5 |

TABLE 1B

Illustrative HPLC conditions

| | |
|---|---|
| HPLC system | Agilent 1100/1200 |
| Column | Agilent Poroshell HPH C18, 100 Å (4.6 × 150 mm, 2.7 μm) |
| Mobile Phase A | 20 mM ammonium formate in water |
| Mobile Phase B | Acetonitrile |

TABLE 1B-continued

Illustrative HPLC conditions

| | |
|---|---|
| Column temperature | 21° C. |
| Flow rate | 0.9 mL/min |
| Injection volume | 2 or 5 µL |
| Acquisition time | 34 min |
| UV detection | 256 nm |

| | Gradient | | |
|---|---|---|---|
| Elution profile: | Time (min) | % A | % B |
| | 0.0 | 95 | 5 |
| | 5.0 | 75 | 25 |
| | 25.0 | 35 | 65 |
| | 26.0 | 10 | 90 |
| | 29.0 | 10 | 90 |
| | 29.1 | 95 | 5 |
| | 34.0 | 95 | 5 |

Example 1

Example 1A

A reactor was charged with triphosgene (0.4 equiv) and anhydrous acetonitrile (solvent, 3.0 L/kg relative to Compound B). The contents of the reactor were agitated until homogenous and cooled to −5° C. A solution of Compound B (1.0 equiv) and N,N-diisopropylethylamine (1.0 equiv) in anhydrous acetonitrile (1.0 L/kg) was added to the phosgene solution over 1 hour, maintaining internal temperature at ≤0° C. The batch was stirred at 0° C. for 15 minutes and then warmed to 25° C. The reaction of Compound B and triphosgene formed Compound C, which was not isolated. Subsurface sparge with dry N2 was performed at 25° C. for several minutes to remove residual phosgene, venting the vapors to a scrubber containing aqueous ammonia solution. Compound D (1.1 equiv) was charged as a solid, and the contents of the reactor were heated and stirred at 80° C. until full conversion of Compound C to Compound E, as determined by HPLC. The reaction mixture was cooled to ≤12° C. Compound E was not isolated. Tetramethylguanidine (TMG) (6.0 equiv) was added while maintaining batch temperature at ≤17° C. The reaction mixture was agitated at 15° C. until full conversion of Compound E to Compound A, as determined by HPLC. Aqueous phosphoric acid (6M) (6.0 equiv) was added at a temperature of 25° C. or less. The resulting product slurry was filtered, washed with 1:4 acetonitrile: water (v/v) (3×3 L/kg) and deliquored. The product was dried to constant weight at ambient temperature under stream of nitrogen. Typically, the above procedure provided 75% yield of Compound A, based upon starting amount of Compound B, with ≥99.5% purity by HPLC (RT: 15.1 min under conditions shown in Table 1B above, injection volume 2 µL).

Example 1B

A reactor was charged with anhydrous acetonitrile (solvent, 3.0 L/kg relative to Compound B) and the contents of the reactor were cooled to −5° C. Triphosgene (0.366 equiv) was then charged to the reactor and the contents were agitated for 15 minutes at −5° C. A solution of N,N-diisopropylethylamine (0.0175 equiv) in anhydrous acetonitrile (solvent, 0.1 L/kg relative to Compound B) was charged to the reactor and the contents were agitated for 1.5 hours at −5° C. A solution of Compound B (1.0 equiv) and N,N-diisopropylethylamine (1.0 equiv) in anhydrous acetonitrile (solvent, 1.0 L/kg relative to Compound B) was added via subsurface addition to the phosgene solution over 4 hours, maintaining the internal batch temperature at −5° C. The batch was stirred at 0° C. for 15 minutes and then warmed to 25° C. The reaction of Compound B and phosgene formed Compound C, which was not isolated. Compound D (1.1 equiv) was charged as a solid, and the contents of the reactor were heated and stirred at 80° C. until full conversion of Compound C to Compound E, as determined by HPLC. The reaction mixture was cooled to 20° C. Compound E was not isolated. 1,8-Diazabicyclo[5.4.0]undec-7-ene (DBU) (4.5 equiv) was added while maintaining the batch temperature at 20° C. The reaction mixture was agitated at 20° C. until full conversion of Compound E to Compound A, as determined by HPLC. Aqueous phosphoric acid (4.5M) (4.5 equiv) was added at a temperature of 20° C. The resulting product slurry was filtered, washed with 30:70 acetonitrile: water (v/v) (3×3 L/kg) and deliquored. The product was dried to constant weight at ambient temperature under stream of nitrogen. Typically, the above procedure provided 80% yield of Compound A, based upon starting amount of Compound B, with ≥99.5% purity by HPLC (RT: 15.1 min under conditions shown in Table 1B above, injection volume 2 µL).

Example 2

An equimolar mixture of Compound B and N,N-disopropylethylamine base dissolved in anhydrous acetonitrile was added slowly into a slight excess of triphosgene dissolved in anhydrous acetonitrile while maintaining the internal temperature below 0° C. The resulting suspension of Compound C as hydrochloride salt was warmed to 25° C. and excess of phosgene was purged by subsurface sparging with nitrogen. Compound C was then combined with slight excess of Compound D and heated near reflux (approximately 80° C.). Upon a clean coupling reaction over a period of few hours, the product Compound E crystallized out as Urea hydrochloride salt during the course of the reaction at 80° C. Cyclization of Compound E to Compound A was accomplished in the presence of excess tetramethylguanidine (TMG) as a base and was performed either as a through-process, or with an intermediate isolation of Compound E. Compound A was crystallized by addition of aqueous phosphoric acid at 20° C. and isolated as a colorless crystalline material in high yield (75-80%, based upon starting amount of Compound B) and purity (99.5% by HPLC).

Example 3

A dry 100 mL reactor was charged with triphosgene (5.53 g, 18.64 mmol, 0.4 equiv) and anhydrous acetonitrile (21 mL, 3.0 volumes per Compound B). Optional 0.5 volume acetonitrile rinse. Stirred until homogeneous and cooled to −5° C. Solutions of triphosgene in acetonitrile were shown to gradually liberate dissolved phosgene when left standing. The process became nearly instantaneous in the presence of catalytic base (for example, DIPEA 0.1 equiv). Excessive sparging of the headspace was avoided to maintain correct phosgene stoichiometry.

Alternatively, phosgene (55.9 mmol, 1.2 equiv) was dissolved in pre-cooled acetonitrile (to 0 to −35° C.). A solution of Compound B (7.0 g, 46.6 mmol, 1.0 equiv) and N,N-diisopropylethylamine (8.13 mL, 46.6 mmol, 1.0 equiv) in anhydrous acetonitrile (7.0 mL, 1 vol per Compound B) was charged to the phosgene solution over not longer than 1 h, while maintaining an internal temperature of 0° C.

The hydrochloride salt of Compound C crystallized from the reaction mixture forming a slurry. The batch was stirred at no more than 0° C. for 15 minutes and then warmed to 25° C. Subsurface sparge with dry nitrogen was performed at 25° C. for 15 minutes to remove residual phosgene since excess phosgene prevents Compound D from reacting with Compound C.

The water content of Compound D was analyzed before proceeding. If the water levels were above 200 ppm, then Compound D was by azetropic distillation until water level is 200 ppm or less. Compound D (10.71 g, 51.23 mmol, 1.1 equiv) was charged as a solid (optional 0.5 volume acetonitrile rinse) and the mixture was heated at 80° C. overnight, wherein the reaction mixture became homogeneous upon reaching a temperature of 60° C. Assay for conversion from Compound C (pull sample, quench with methanol, analyze for methanol adduct of Compound C) was used to monitor completion of reaction. Compound E, as the hydrochloride salt, crystallized, forming a slurry.

At this stage, Compound E hydrochloride was isolated by filtration, rinsed with acetonitrile and dried under nitrogen to provide approximately 86% yield of analytically pure Compound E as the hydrochloride salt, wherein less than 0.5% of Compound C remains. The reaction mixture was cooled to not more than 12° C. Tetramethylguanidine (32 g, 279 mmol, 6.0 equiv) is added dropwise at not more than 17° C. The reaction mixture was agitated at 15° C. for no longer than 24 h to cyclize and form Compound A.

An alternative process for forming Compound A was as follows: Compound E as the hydrochloride salt in 3 volumes of DMSO was reacted with 5.0 equiv TMG at 15° C. Conversion of Compound E to Compound A occurred at a faster rate in DMSO (few hours), with fewer side products (reduced fragmentation to side products such as an aniline Compound B and amide Compound D). The resulting formation of Compound A proceeded in high assay yield (approximately 98%), based upon starting Compound E.

Compound A was crystallized from the reaction by adding 6M aqueous phosphoric acid (46 mL, 279 mmol, 6.0 equiv) at around room temperature. Upon addition of the phosphoric acid, the reaction mixture had a pH of 3.7.

Compound A was isolated by filtration on medium porosity fritted funnel. The wet cake was slurry-washed with, for example, 2:8 acetonitrile: water (v/v). The wet cake was dried to constant weight at room temperature under nitrogen/vacuum to provide Compound A in 75% yield from Compound B and greater than 99% purity (i.e., 99.5%), as determined by chromatography.

Example 4

Various parameters for the conversion of Compound B to Compound E were investigated, including organic solvents, amounts of first base, the addition of acid, and salt removal (for example, by filtration).

Reactions were conducted using 100 mg of Compound B. In summary, solutions of Compound B were prepared in the noted solvent. Triphosgene (0.4 equiv) in the solvent (10 volumes) was added to Compound B at room temperature and stirred for 45 minutes. To each solution was added a solution of Compound D (1 equiv) in the solvent (10 volume) at 60° C. for 20 h (at room temperature for DCM). In experiments comprising the addition of acid, 4M hydrochloric acid as a 10% solution in dioxanes was added. The reaction mixtures were diluted with methanol and analyzed.

The results of the evaluation are summarized in Table 2.

TABLE 2

Evaluation of reaction conditions for the one-pot conversion of Compound B to Compound E.

| ID | Org. Solvent | First Base (equiv) | Salts filtered | HCl added | Cond.[1] | (Cpd D) % conv. | (Cpd D) % LCAP | Sym Urea % LCAP | (Cpd E) % LCAP | (Cpd E) AY (%) |
|---|---|---|---|---|---|---|---|---|---|---|
| 4A | DCM | 2 | N | no | A | 21.3% | 30.6% | 5.8% | 8.3% | 6.3% |
| 4B | DCM | 2 | N | 10% | A | 14.7% | 33.3% | 15.3% | 5.7% | 4.4% |
| 4C | DCM | 2 | N | 20% | A | 15.8% | 31.8% | 15.3% | 5.9% | 4.7% |
| 4D | DCM | 2 | N | 50% | A | 10.1% | 33.6% | 17.3% | 3.8% | 2.8% |
| 4E | DCM | 4 | N | no | A | 64.9% | 18.9% | 25.9% | 34.9% | 31.5% |
| 4F | DCM | 4 | N | 10% | A | 61.4% | 20.4% | 29.0% | 32.4% | 29.8% |
| 4G | DCM | 4 | N | 20% | A | 62.7% | 20.4% | 29.0% | 34.2% | 30.3% |
| 4H | DCM | 4 | N | 50% | A | 57.7% | 21.6% | 33.5% | 29.4% | 23.8% |
| 4I | MeTHF | 2 | Y | 10% | B | 15.0% | 70.7% | 10.5% | 12.5% | 4.2% |
| 4J | MeTHF | 2 | Y | no | B | 17.6% | 74.9% | 1.5% | 16.0% | 5.1% |
| 4K | MeTHF | 2 | N | 10% | B | 84.4% | 12.4% | 15.7% | 66.7% | 59.3% |
| 4L | MeTHF | 2 | N | no | B | 81.1% | 14.2% | 18.1% | 60.8% | 52.6% |
| 4M | MeTHF | 4 | Y | 10% | B | 68.6% | 21.8% | 9.5% | 47.5% | 33.7% |
| 4N | MeTHF | 4 | Y | no | B | 70.2% | 22.3% | 12.9% | 52.5% | 35.9% |
| 4O | MeTHF | 4 | N | 10% | B | 75.7% | 15.1% | 14.2% | 46.9% | 40.2% |
| 4P | MeTHF | 4 | N | no | B | 76.7% | 14.9% | 15.3% | 49.0% | 39.5 |
| 4Q | TOL | 2 | Y | 10% | B | 1.8% | 90.9% | 6.6% | 1.6% | 0.5% |
| 4R | TOL | 2 | Y | no | B | 0.7% | 75.9% | 4.2% | 0.51% | 0.2% |
| 4S | TOL | 2 | N | 10% | B | 88.9% | 9.1% | 11.2% | 72.6% | 65.4% |
| 4T | TOL | 2 | N | no | B | 82.8% | 13.0% | 15.0% | 62.4% | 53.1% |
| 4U | TOL | 4 | Y | 10% | B | 72.9% | 20.1% | 7.8% | 54.0% | 38.1% |
| 4V | TOL | 4 | Y | no | B | 74.4% | 17.7% | 12.7% | 51.4% | 38.6% |
| 4W | TOL | 4 | N | 10% | B | 72.4% | 17.1% | 11.3% | 44.8% | 35.2% |
| 4X | TOL | 4 | N | no | B | 82.2% | 9.4% | 2.0% | 43.2% | 29.9% |

[1]A = RT, 20 h;
B = 60° C., 20 h,
LCAP = liquid chromatography area percent

As demonstrated by results in Table 2, reactions conducted using MeTHF and toluene as solvents provided good yields of Compound E with good purity. Moreover, the reactions wherein in 2 equiv of first base and/or salts were not filtered provided suitable results. In particular, Examples 4K, 4L, 4S, and 4T, wherein the solvent was MeTHF or toluene, 2 equiv of first base, and salts were not filtered provided good results. Further, the addition 10% HCl/dioxanes (for example, 4K and 4S) provided improved yields.

Example 5

Various parameters (for example, second base, amount of second base, solvent, and temperature) were evaluated to investigate the relative $k_{SNAr}/k_{Frag}$ selectivity (Compound A: Compound D) for the conversion of Compound E to Compound A.

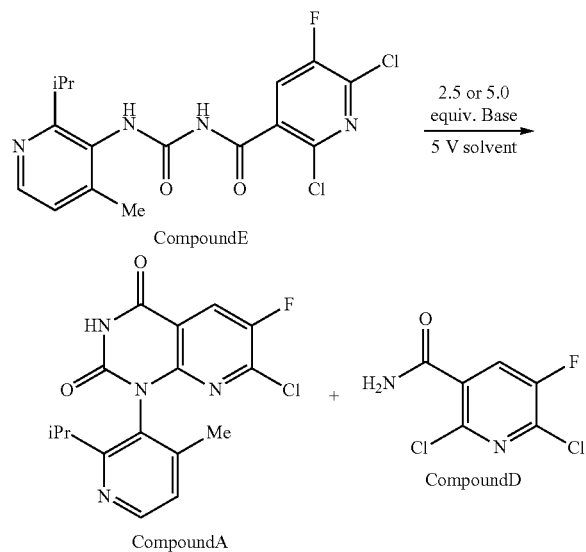

In summary, each reaction vessel was charged with Compound E, after which DBU or TMG in 5 volumes of the solvent indicated in Table 3 was added at either 73° C. or 35° C. The reactions were monitored by liquid chromatography. The results are summarized in Table 3.

TABLE 3

Study of reaction conditions for the conversion of Compound E to Compound A

| ID | Second Base (equiv) | Temperature (° C.) | Solvent | Selectivity |
|---|---|---|---|---|
| 5A | DBU (2.5) | 73 | ACN | 0.81 |
| 5B | DBU (5.0) | 73 | ACN | 0.79 |
| 5C | DBU (2.5) | 73 | MeTHF | 0.31 |
| 5D | DBU (5.0) | 73 | MeTHF | 0.29 |
| 5E | DBU (2.5) | 73 | NMP | 0.96 |
| 5F | DBU (5.0) | 73 | NMP | 1.02 |
| 5G | TMG (2.5) | 73 | ACN | 1.31 |
| 5H | TMG (5.0) | 73 | ACN | 1.40 |
| 5I | TMG (2.5) | 73 | MeTHF | 0.15 |
| 5J | TMG (5.0) | 73 | MeTHF | 0.20 |
| 5K | TMG (2.5) | 73 | NMP | 1.18 |
| 5L | TMG (5.0) | 73 | NMP | 1.19 |
| 5M | TMG (2.5) | 35 | ACN | 5.38 |
| 5N | TMG (5.0) | 35 | ACN | 6.29 |
| 5O | TMG (2.5) | 35 | NMP | 12.88 |
| 5P | TMG (5.0) | 35 | NMP | 14.42 |
| 5Q | TMG (2.5) | 35 | DMSO | 21.48 |
| 5R | TMG (5.0) | 35 | DMSO | 20.09 |

TABLE 3-continued

Study of reaction conditions for the conversion of Compound E to Compound A

| ID | Second Base (equiv) | Temperature (° C.) | Solvent | Selectivity |
|---|---|---|---|---|
| 5S | TMG (2.5) | 35 | sulfolane | 15.98 |
| 5T | TMG (5.0) | 35 | sulfolane | 16.76 |

As demonstrated by the results in Table 3, reactions conducted using TMG as the second base provided good results. Moreover, reactions performed using NMP, ACN, DMSO and sulfolane provided good results.

The effect of the dielectric constant (E) of the solvent was also investigated. TMG (4.0 equiv) in 1.3 volumes of solvent was added over 10 min to a solution of Compound E (3.0 g) in 3 vol of solvent (DMSO, DMA, DMF). The reaction temperature was maintained at not more than at not more than 27° C. during the addition. The results are summarized in Table 4.

TABLE 4

Effect of solvent dielectric constant on the conversion of Compound E to Compound A

| Solvent | ε | Cpd D at $T_0$ | Cpd A at $T_0$ | Cpd E remaining | Cpd A (% AY) |
|---|---|---|---|---|---|
| DMSO | 46.7 | 0.36% | 59 A % | 0.52 A % | 93% |
| DMA | 37.8 | 0.34% | 20 A % | 1.20 A % | 89% |
| DMF | 36.7 | 0.37% | 23 A % | 1.14 A % | 88% |

The amount of product representing the fragmentation product (i.e., Compound D) was similar in all solvents (about 0.3 A % or 2.5 mol %) at the end of TMG addition indicating that the fragmentation pathway/product is not impacted by the dielectric constant. Moreover, the low amounts of Compound E remaining at the end of the reaction (EOR) demonstrate that Compound E was efficiently converted to Compound A.

Example 6

As demonstrated by the results in the scheme below the use of DBU in the conversion of Compound E to Compound A results in higher LCAP conversion to Compound A. A major impurity (TMG trapping of Compound C) is observed when TMG is used as the base in the reaction.

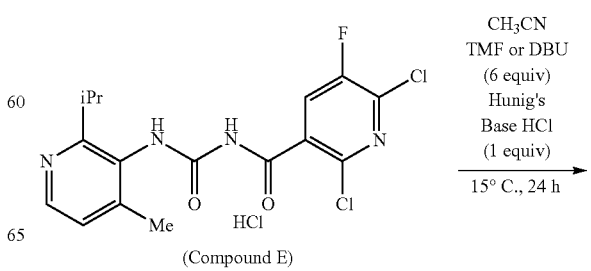

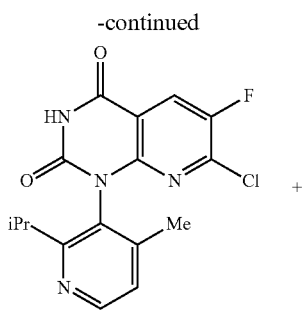

(Compound A)
For TMG, 89.9 LCAP Compound A
For DBU, 95.1 LCAP Compound A

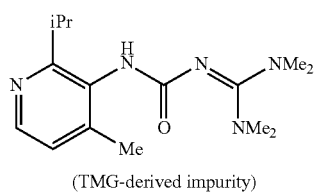

(TMG-derived impurity)

As demonstrated by the results in the scheme below the use of DBU in the process furnishes an end of reaction crude mixture with higher LCAP of Compound A and increased the yield from 75% to 80%.

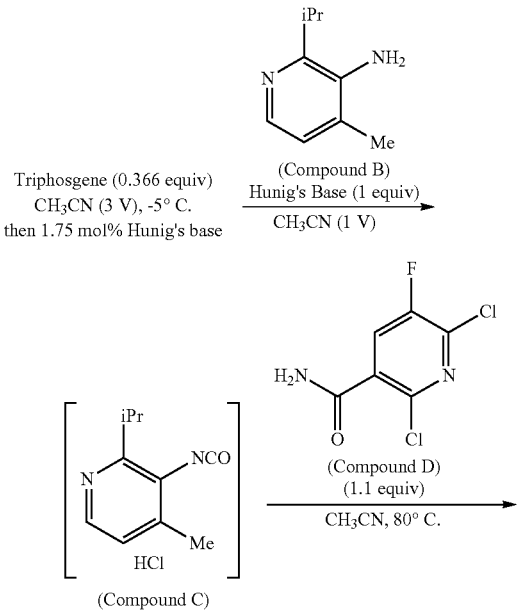

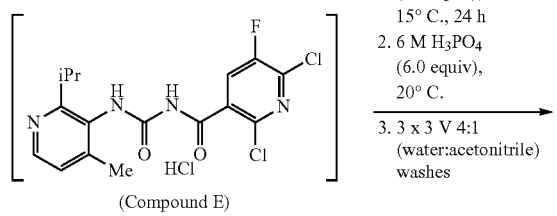

(Compound E)

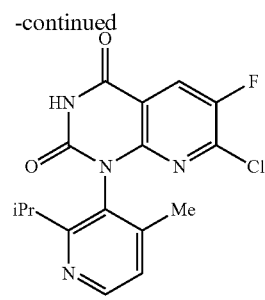

(Compound A)
For TMG, 84.7 LCAP Compound A At End Of Reaction
For DBU 88.5 LCAP Compound A At End Of Reaction All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (for example, "such as") provided herein, is intended merely to better illuminate the invention and does not pose a limitation on the scope of the invention unless otherwise claimed. No language in the specification should be construed as indicating any non-claimed element as essential to the practice of the invention.

What is claimed:
1. A process of preparing compound A

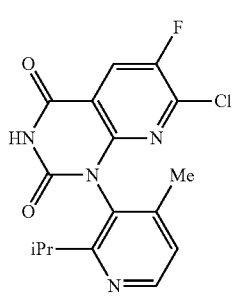

(A)

comprising:
(a) admixing 2-isopropyl-4-methylpyridin-3-amine (Compound B), or a salt thereof, a first base, and a reactive compound comprising phosgene or a phosgene equivalent in an organic solvent to form 3-isocyanato-2-isopropyl-4-methylpyridine (Compound C);
(b) admixing Compound C and 2,6-dichloro-5-fluoronicotinamide (Compound D) to form 2,6-dichloro-5-fluoro-N-((2-isopropyl-4-methylpyridin-3-yl) carbamoyl) nicotinamide (Compound E); and
(c) admixing Compound E and a second base to form a product mixture comprising Compound A.

2. The process of claim 1, wherein Compound B is a free base.

3. The process of claim 2, wherein the first base is an amine.

4. The process of claim 3, wherein the amine is a tertiary amine.

5. The process of claim 4, wherein the tertiary amine is N,N-diisopropylethylamine.

6. The process of claim 1, wherein the reactive compound is phosgene.

7. The process of claim 1, wherein the reactive compound is a phosgene equivalent.

8. The process of claim 7, wherein the phosgene equivalent is trichloromethyl carbonochloridate, bis(trichloromethyl) carbonate, di(imidazol-1-yl)methanone, or bis(2,5-dioxopyrrolidin-1-yl)carbonate.

9. The process of claim 7, wherein the phosgene equivalent is bis(trichloromethyl) carbonate.

10. The process of claim 1, wherein the organic solvent comprises anhydrous acetonitrile.

11. The process of claim 1, wherein the organic solvent comprises a solvent selected from the group consisting of 2-methyltetrahydrofuran, toluene, acetonitrile, NMP, DMSO, and sulfolane.

12. The process of claim 1, wherein the second base comprises 1,5,7-triazabicyclo(4.4.0)dec-5-ene (TBD), 7-methyl-1,5,7-triazabicyclo(4.4.0) dec-5-ene (MTBD), 1,8-diazabicyclo[5.4.0]undec-7-ene (DBU), 1,5-diazabicyclo[4.3.0]non-5-ene (DBN), 1,1,3,3-tetramethylguanidine (TMG), or a combination thereof.

13. The process of claim 12, wherein the second base comprises TMG.

14. The process of claim 12, wherein the second base comprises DBU.

15. The process of claim 1, further comprising crystallizing Compound A from the product mixture by adding an aqueous solution of an acid.

16. The process of claim 15, wherein the acid is phosphoric acid.

17. The process of claim 15, further comprising isolating the crystalized Compound A by filtration.

18. The process of claim 1, wherein Compound C and Compound E are not isolated prior to subsequent reaction to provide Compound A.

19. The process of claim 1, wherein Compound B is a free base, the first base is N,N-diisopropylethylamine, the reactive compound is phosgene or bis(trichloromethyl) carbonate, and the organic solvent comprises anhydrous acetonitrile.

20. The process of claim 19, wherein the reactive compound is bis(trichloromethyl) carbonate.

21. The process of claim 1, further comprising using Compound A to synthesize Compound F:

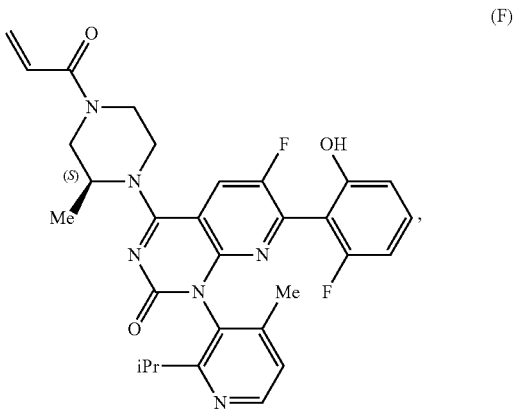

a pharmaceutically acceptable salt, atropisomer, or a pharmaceutically acceptable salt of an atropisomer thereof.

22. The process of claim 19, further comprising using Compound A to synthesize Compound F:

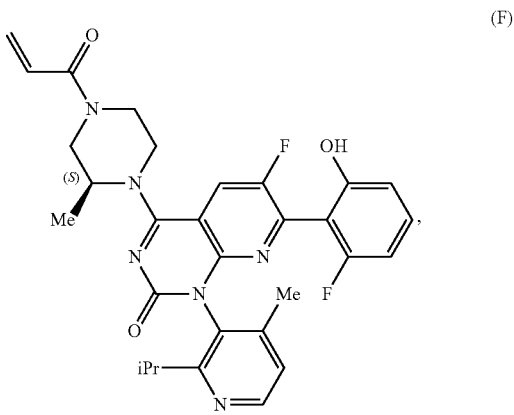

a pharmaceutically acceptable salt, atropisomer, or a pharmaceutically acceptable salt of an atropisomer thereof.

* * * * *